United States Patent
Ma et al.

(10) Patent No.: US 6,444,356 B1
(45) Date of Patent: Sep. 3, 2002

(54) LITHIUM BATTERY WITH SECONDARY BATTERY SEPARATOR

(76) Inventors: Jackson C. Ma, 3214 Cedar Trail, Middleton, WI (US) 53562; El-Sayed Megahed, 1413 Mound St.; Timothy J. Stachoviak, 5806 Russett Rd., both of Madison, WI (US) 53711; Shirley A. Craanen, 165 Division St., #3, Madison, WI (US) 53704; Daniel A. Schneider, 7321 Southern Oak Pl., Madison, WI (US) 53719; Joseph P. Nestler, 616 Aspen Ave., Verona, WI (US) 53593

(*) Notice: Subject to any disclaimer, the term of this patent is extended or adjusted under 35 U.S.C. 154(b) by 0 days.

(21) Appl. No.: 09/535,328

(22) Filed: Mar. 27, 2000

Related U.S. Application Data

(63) Continuation of application No. 08/743,132, filed on Nov. 1, 1996, now abandoned.

(51) Int. Cl.[7] .............................................. H01M 2/16
(52) U.S. Cl. ...................... 429/145; 429/144; 429/254; 429/316
(58) Field of Search ................................ 429/316, 145, 429/254, 144

(56) References Cited

U.S. PATENT DOCUMENTS

| | | | |
|---|---|---|---|
| 3,749,604 A * | 7/1973 | Langer et al. | |
| 3,801,404 A | 4/1974 | Druin et al. | |
| 3,843,761 A | 10/1974 | Bierenbaum et al. | |
| 4,138,459 A | 2/1979 | Brazinsky et al. | |
| 4,550,064 A | 10/1985 | Yen et al. | 429/94 |
| 4,883,727 A * | 11/1989 | Liska | |
| 4,965,147 A * | 10/1990 | Mas et al. | |
| 4,994,335 A | 2/1991 | Kamaei et al. | 429/254 |
| 5,219,680 A | 6/1993 | Fauteux | 429/192 |
| 5,227,264 A | 7/1993 | Duval et al. | 429/153 |
| 5,260,148 A | 11/1993 | Idota | 429/198 |
| 5,290,644 A * | 3/1994 | Andrieu | |
| 5,296,318 A | 3/1994 | Gozdz et al. | |
| 5,350,645 A | 9/1994 | Lake et al. | 429/124 |
| 5,380,606 A | 1/1995 | Itou et al. | |
| 5,387,479 A | 2/1995 | Koksbang | 429/126 |
| 5,401,598 A | 3/1995 | Miyabayashi et al. | |
| 5,426,006 A | 6/1995 | Delnick et al. | 429/218 |
| 5,427,872 A | 6/1995 | Shen et al. | 429/142 |
| 5,429,891 A | 7/1995 | Gozdz et al. | |
| 5,460,904 A | 10/1995 | Gozdz et al. | |
| 5,478,364 A | 12/1995 | Mitate et al. | 29/623.5 |
| 5,478,673 A | 12/1995 | Funatsu | 429/197 |
| 5,498,489 A | 3/1996 | Dasgupta et al. | 424/152 |
| 5,512,389 A | 4/1996 | Dasgupta et al. | 429/192 |
| 5,514,490 A | 5/1996 | Chen et al. | |
| 5,518,842 A | 5/1996 | Fey et al. | |
| 5,540,741 A | 7/1996 | Gozdz et al. | 29/623.5 |
| 5,571,634 A | 11/1996 | Gozdz et al. | 429/192 |
| 5,607,485 A | 3/1997 | Gozdz et al. | 29/623.5 |
| 5,677,083 A | 10/1997 | Tomiyama | 429/194 |
| 5,686,201 A | 11/1997 | Chu | 429/52 |
| 5,691,047 A | 11/1997 | Kurauchi et al. | 428/315.7 |
| 5,702,845 A | 12/1997 | Kawakami et al. | 429/224 |
| 5,705,292 A | 1/1998 | Yukita et al. | 429/137 |
| 5,714,277 A | 2/1998 | Kawakami | 429/62 |
| 5,731,104 A | 3/1998 | Ventura et al. | 429/188 |

FOREIGN PATENT DOCUMENTS

JP         3-20964     *   1/1991

* cited by examiner

*Primary Examiner*—John S. Maples
(74) *Attorney, Agent, or Firm*—Michael Best & Friedrich LLP; Grady J. Frenchick, Esq.; Charlene L. Yager, Esq.

(57) ABSTRACT

A secondary battery separator comprises a fibrous core coated with a polymer having improved electrode adhesion properties in unitary laminated construction. Vacuum removal of plasticizer without solvent extraction prevents brittleness and results in microporosity in a thin layer of enhanced ion conductivity.

1 Claim, 6 Drawing Sheets

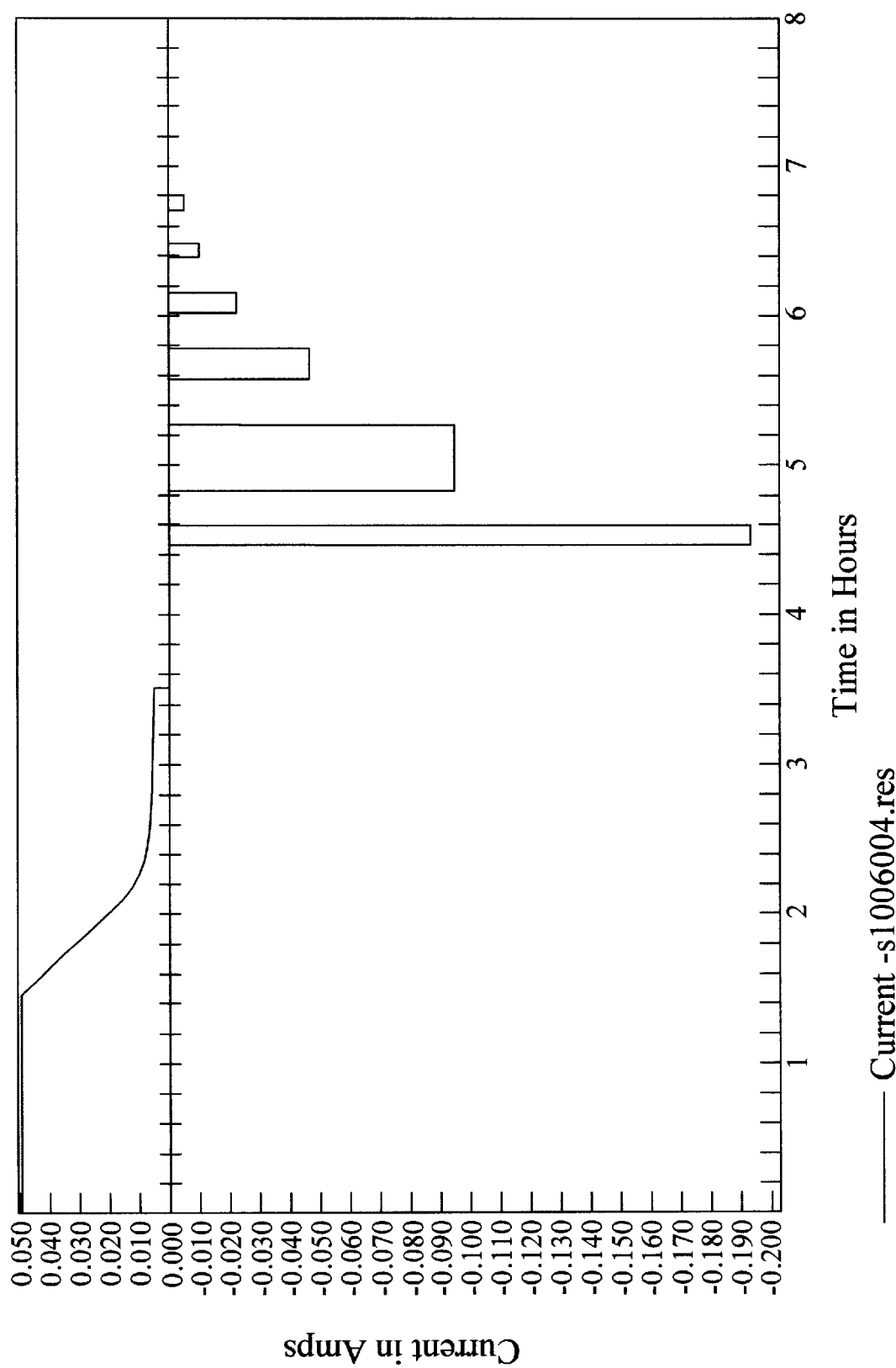

LITHIUM BATTERY WITH SECONDARY BATTERY SEPARATOR

CROSS REFERENCE TO RELATED APPLICATION

This is a continuation of application Ser. No. 08/743,132, filed Nov. 1, 1996 abandoned.

FIELD OF THE INVENTION

The present invention relates to rechargeable, polymer lithium or lithium ion batteries and more particularly to a separator component with improvements in function and manufacturability.

BACKGROUND OF THE INVENTION

In the construction of any battery, six elements must be present, namely, a positive and negative electrode, a housing, a separator, an electrolyte, and current collectors. The separator is an important element because it must be permeable to ions moving back and forth during charging and discharging, but must not permit flow of electrons directly from pole to pole, which shorts out the current, and prevents electrons from flowing from anode to cathode through a circuit. In rechargeable lithium ion batteries, which are generally formed of very thin layers of the components, it is important that the distance between electrodes be as short as possible to permit efficient ion transfer, but not so short as to permit electron flow.

Separators have been constructed of very thin sheets of plastic, which are rendered porous by removal of plasticizers from cast films. In general a nonaqueous environment is maintained, since lithium salts are notoriously reactive with electrode components in aqueous solutions. Aprotic organic solvents such as propylene carbonate or ethylene carbonate are commonly used in which lithium salt solutes are readily dispersable. Other solvents are tetrahydrofuran, 1,2-dimethoxyethane, dimethyl carbonate and diethoxyethane. For a discussion of conventional solvent/lithium solute systems, see S. Hossain, "Rechargeable Lithium Batteries (Ambient Temperature)", in *Handbook of Batteries and Fuel Cells*, D. Linden, Ed., McGraw-Hill, 2nd Ed., 1995. The plastic separator, of course, must be stable to the solvent selected.

U.S. Pat. Nos. 4,138,459, 3,801,404, and 3,843,761 disclose a method of producing a porous plastic separator by stretching a crystalline polyolefin film at a temperature below its transition temperature. Performance of such stretched polymers is impaired, however, because lack of control over uniform pore size leads to excessive distance between electrodes. U.S. Pat. No. 4,994,335 discloses a stretching process in which the strain rate and temperature of the process are tightly controlled, to produce microporosity in only one direction, so that fine fibrils are connected between adjacent unstretched planar flat portions in two dimensions.

A serious problem arises when the electrolyte lithium salts react in the complete cell to form dendrites of lithium, which tend to short out the battery by filling the void spaces of the separator and creating a conductive pathway. U.S. Pat. No. 5,427,872 discloses a method of preventing dendrite shorting, by disposing a dendrite reactive inert polypropylene or polyethylene composite separator along with a fluorinated polymer such as polyfluoroethylene. Porosity is maintained by prevention of dendrite penetration of the electrode-protective second separator.

In an alternative approach, U.S. Pat. Nos. 5,460,904, 5,296,318, 5,429,891 disclose a separator comprising a self-supporting film of a copolymer of vinylidene fluoride (PVdF) and hexafluoropropylene (HFP). Prior to casting, the copolymers are mixed with a medium to high temperature boiling plasticizer solvent such as dibutyl phthalate (DBP) and a filler such as $SiO_2$. After casting, the plasticizer is leached out (extracted) with a solvent such as ethylether, and replaced by cell electrolyte. The spaces occupied by the plasticizer are filled with electrolyte in a communicating network of vacuoles permitting ion diffusion. In a preferred embodiment, the "dry" separator may be joined with the electrodes by lamination under heat and pressure prior to electrolyte loading.

U.S. Pat. No. 4,550,064 discloses a separator comprising two layer, the first inner layer composed of microporous polypropylene (Celgard) or fiberglass whose surfaces are made more hydrophilic by coating with imidazoline. These separators are to be used in combination with a positive electrode manufactured with a propylene/ethylene elastomer binder.

The foregoing separators have certain disadvantages. Multi-layer separators have a step gradient of porosity with different diffusion constants for electrolyte in each layer. Efficiency of ion transfer may be impaired which interferes with the discharge rate of the battery, and may adversely affect capacity. In the case of the separators made from PVdF and HFP, solvent leaching causes brittleness which leads to a significant level of product failure during lamination. Co-mingling of leaching solvent and plasticizer which cannot be reused also creates a disposal problem.

SUMMARY OF THE INVENTION

In accordance with the present invention, a separator suitable for use in a secondary lithium battery is made of a pre-formed porous non-woven mat comprising a first homopolymer of polypropylene, polyethylene, or polyvinylalcohol, coated with a second homopolymer. Porosity of the homopolymeric coating, which may preferably be polyvinylidene difluoride, is obtained by first mixing the homopolymer with a low boiling solvent selected from one or more non-aromatic aliphatic diesters, followed by forming a layer of the polymer diester mixture. The resultant separator, positionable between anode and cathode electrodes, comprises a porous core layer matrix, the layer having opposite surfaces, and at least one of the surfaces having a porous homopolymeric coating applied thereto. Then remove the solvent plasticizer by applying a vacuum. The separator construct is sufficiently permeable to electrolyte ions to minimally discharge a secondary battery having a carbonaceous or other lithium intercalation anode and a lithium metal oxide cathode, 30 percent at 2 C.

In use, the separator is a component of a rechargeable lithium battery comprising a housing, preferably sealed in plastic, electrodes contained in the housing including a carbonaceous or other lithium intercalation anode consisting of amorphous graphite, coke, filamentous carbon, or combinations thereof, and a lithium metal oxide cathode, an electrolyte solution in the housing, the electrolyte solution containing a lithium metal salt capable of ionizing in an organic solvent, the salt being dispersed in the organic solvent, current collectors electrically connected and disposed in contact with the electrodes, and the separator disposed between the electrodes, the separator including a fibrous matrix core having surfaces, and a porous homb-polymeric coating layer applied to at least one of the matrix core surfaces.

In the process of manufacturing the separator, a fibrous polymeric core matrix is coated with a second polymer mixture containing a non-aromatic solvent plasticizer of low boiling temperature, and acetone, and then removing the plasticizer by heating under vacuum, to create a microporous layer conductive to lithium salt ions. A rechargeable battery of simple unitary construction is produced by aligning in stacked registration a carbonaceous or other lithium intercalation anode, a lithium metal oxide cathode, and the separator, the separator being disposed between the carbonaceous or other lithium intercalation anode and entrained lithium salt polymeric cathode, and laminating the anode, cathode, and separator by application of heat and pressure sufficient to cause adhesion of the anode, cathode, and separator into a unitary structure.

In a further battery embodiment, an additional cathode is added to the laminated structure of the secondary lithium ion battery by positioning a second separator on the outer side of the anode and interfacing in aligned stacked registration a second cathode layer, to form a binary structure represented by the structure: +s–s++s–s+ wherein + is a cathode layer, – is a anode layer, and s is a separator. The thickness of the layers is adjusted to balance the specific charge capacity of anode and cathode.

BRIEF DESCRIPTION OF THE DRAWINGS

FIGS. 2a–d are rectilinear plots of various battery charging and discharging parameters.

DESCRIPTION OF THE PREFERRED EMBODIMENT

Figure 1:
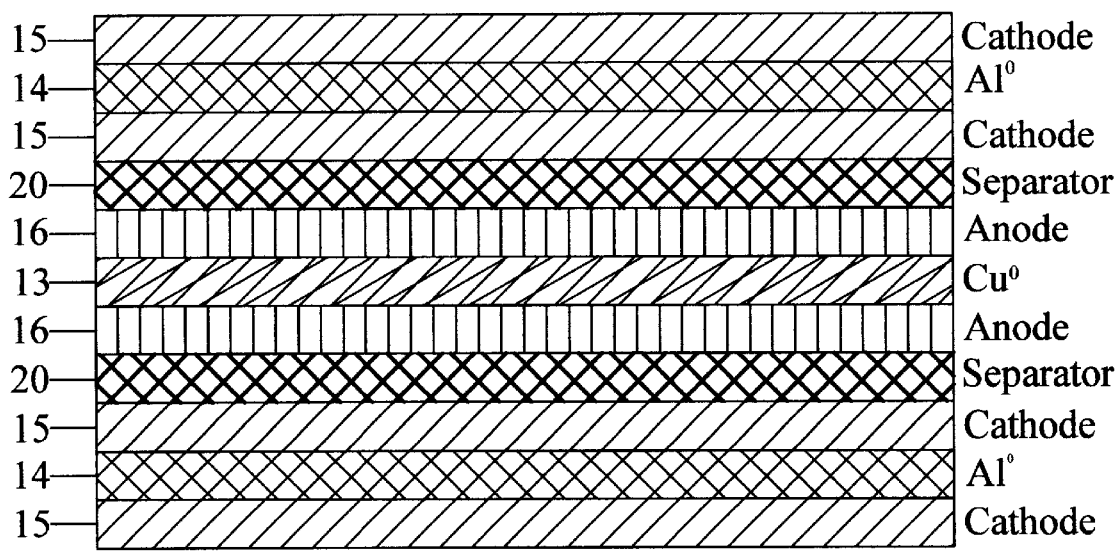
FIG. 1 is a schematic cross-sectional drawing of a typical plastic layered battery.

In polymer lithium or lithium rechargeable ion batteries the separator is critical not only to the proper functioning of the battery, but also to its manufacturability. There are many manufacturing strategies known in the art for causing the anode, cathode, and separator elements to be juxtaposed, so that ions can flow freely back and forth between the electrodes in successive charging and discharging cycles. For example, the layers can be aligned and then wound into a tight coil, or may be compressed and restrained mechanically. Ideally, however, a stable laminate of highly elastic construction would permit a much larger range of use, and provide extreme flexibility in the types of housings that contain the battery components. Thus, the laminated structures of the prior art have largely remained laboratory curiosities because of a tendency for the separator to fracture during lamination, causing the battery to short. Fracture is defined as cracks or compression of the separator. Such batteries, if laminated under reduced pressures to avoid fracture, often pull apart or the layer interfaces are discontinuous, sharply reducing battery efficiency.

The separator of the present invention consists of two parts, an inner core matrix of a fibrous homopolymer, and an exterior coating consisting of a second homopolymer. The core matrix is a fabric-like composite manufactured in pre-formed rolls by several vendors such as Web Dynamics and Hollingsworth/Voss. These materials are made of minute polymer fibers, finely comminuted into fibers about 0.1 micron in diameter to about 1.5 microns in length. Structurally the matrix fibers are aligned randomly to create very small pores throughout the fabric body. These matrices may be manufactured by deposition of fibers in the desired thickness onto a running conveyor track, and compressed under rollers into sheets in a process similar to paper manufacture. Alternatively, the fiber sheets may be melt blown. The resultant fiber matrix is preferably 0.75 to 5.0 mils in thickness and has a density of between 15 and 50 grams/sq. meter.

The homopolymers of the separator fibers are selected from polyethylene, polypropylene, or a polyvinylalcohol, manufactured by conventional methods. The fibers are made up of semi-randomly disposed strands of high molecular weight polymer. Combinations of homopolymers may theoretically be employed. The homopolymers, being readily commercially available preformed in sheets, have a very low unit cost, and are manufactured according to specifications giving good reproducibility in battery applications. The fiber matrix provides strength and resilience, which may account for its resistance to fracture. Good adhesive properties in the laminate results from controlled coating of the second polymer onto the fiber matrix of the separator.

The selection of coating polymer is largely dependent upon the composition of the underlying matrix material. In the situations in which polyethylene or polypropylene fiber is used, a homopolymeric coating of polyvinylidene difluoride is preferred. For a polyvinylalcohol core, a water compatible coating such as Kynar® Latex milk (Elf-Atochem) or a teflon dispersion such as Dupont T-30 is preferred. The fundamental requirement is that the coating be porous, or be capable of being rendered porous, to permit ion transport. Typically, the homopolymer, which is a powder, is dispersed in an organic solvent such as acetone. A plasticizer is added and the mixture is applied to the fibrous core. Evaporation of the acetone carrier leaves a thin film of polymer. The plasticizer is then removed by heating under vacuum. Temperatures of about 55 to 160 degrees Centigrade may be employed without damaging the separator.

The plasticizers of the present invention are non-aromatic, aliphatic diesters of the general formula $R_1OOC(CH_2)_nCOOR_2$ wherein $R_1$ and $R_2$ are methyl-, ethyl-, propyl-, butyl-, or combinations thereof, and n is 1 to about 7. In general, the preferred plasticizers will have a low (less than 75 degrees Centigrade at reduced pressure) boiling point, so that removal can be readily effected by mild heating under vacuum. This aspect of the invention has three advantages over conventional methods. First, a solvent extraction step is avoided. Second, the plasticizer may be recovered and reused. Third, omission of a solvent extraction avoids any solvent "curing" which may contribute to rigidity or brittleness in the final separator. In addition to volatility, and useful plasticizing properties, the plasticizer must be capable of uniform micro-dispersion throughout the coating layer, so that upon removal a network of microscopic pores renders the coating ion permeable. Optionally, lithium salts contained in the electrolyte solution may be included in the homopolymer, plasticizer, acetone mixture, so that upon removal of the plasticizer in the homopolymer coating, a uniform dispersal of lithium salts is obtained in situ, in advance of lamination.

Many of the polymer matrix sheets available commercially are manufactured with opposing rough and smooth sides. It is essential to apply coating polymer to the rough side first, and then reverse the sides to coat the smooth sides. If the reverse process is practiced, the coating fails to adhere properly, and becomes disengaged from the core matrix. Applicants believe, without being bound to any particular theory, that the rough surface permits close adhesion of the second homopolymer, the homopolymer then permeates the underlying core matrix substantially through to the smooth surface, where it forms a compatible interface and bonding surface for application of a coating to the opposite surface.

Application of coating may be effected by any conventional method including spreading or casting with a doctor blade, rolling, or controlled spraying. In industrial practice, continuous rolling or spraying with sufficient permeation time from the rough surface side is most practical. In coating, the ratio of ingredients in the coating mixture will affect the porosity and adhesive properties of the coated structure. The ratio of homopolymer to plasticizer should preferably be on the order of 2:1 to 1:10, and the ratio of homopolymer/plasticizer to acetone may be between about 1:5 to 2:1 for best results for batteries consistently showing 30 percent discharge at 2 C on a signature curve (See the Example). Ratios are expressed as w/w. Fillers such as $TiO_2$ or $SiO_2$ appear to be unnecessary in the coating to provide material strength.

The secondary battery components that can be used with the separator of the present invention are conventional electrode, electrolyte, and current collector systems known in the solid state (dry) lithium ion field of battery technology using plastic electrode and separator materials. In the electrolyte solutions, typical lithium salts include $LiPF_6$, $LiASF_6$, $LiBF_4$, $LiClO_4$, and $LiN(CF_3SO_2)$. A most preferred salt is $Li[N(SO_2C_2F_5)_2]$. Typical solvent systems for dispersion of the lithium metal ion salt include diethyl and dimethyl carbonate or mixtures thereof, tetrahydrofuran, 1,2-dimethoxyethane, and other organic solvents in which lithium metal salts can ionize. In general, solvents of low viscosity are preferred (in the range of cP at 25 degrees C. of less than 0.5), to facilitate ion migration and diffusion. Water adsorption characteristics are important, since lithium salts are highly unstable in aqueous environments. Suitable solvents must have a water content of less than 10 ppm.

Electrodes in polymer lithium or lithium ion batteries are fabricated from lithium compounds dispersed in thin-layer porous plastic sheets. Any electrochemically compatible cathode and anode elements may utilize the present separator in a battery configuration. Typically in a polymer lithium or lithium ion battery, the cathode is a dispersed lithium salt with or without a binder. Examples include LiMO where M and O are Co, Ni, Mn, or V metal oxides of appropriate valence. Conventional methods of manufacturing cathodes suitable for use with the present separator are disclosed in U.S. Pat. Nos. 5,296,318, 4,550,064, 5,260,148, 5,518,842 and 5,380,606 hereby incorporated by reference.

Anodes in polymer lithium or lithium ion batteries typically carbonaceous, comprised of various forms of doped graphite or doped coke. Lithium ions are often intercalated into the carbonaceous material to yield a $LiC_6$ stoichiometry. U.S. Pat. No. 5,219,680 discloses a method for making such an electrode by entrapping amorphous carbon in a polymeric premix followed by in situ polymerization around a metallic collector element. U.S. Pat. No. 5,514,490 discloses an unusual anode utilizing a layered titanium phosphate followed by intercalation of Li. A further type useful with the present separator is a noncrystalline carbon having low density, and a particular Raman spectrum, as disclosed in U.S. Pat. No. 5,401,598. A preferred carbonaceous or other lithium intercalation anode material is compacted fiberized graphite dispersed in a porous homopolymeric matrix. The foregoing patents are hereby incorporated by reference. Further cathode and anode materials are described in detail in Hossain, supra.

The collector elements useful in the present battery are conventional metals. Preferred collectors are typically perforated with a plurality of minute holes. The liquid plastic electrode carrying the dispersed active material is spread or sprayed over the surfaces of the collector. Fusion of the polymer on the two sides through the polymer penetrating the perforations adds strength, and in multi-cell configuration, provides two current collecting surfaces for each collector metallic strip.

FIG. 1 shows a secondary battery design incorporating the separator of the present invention. A secondary battery 10 has cathode layers 15 which permeated a metallic collector grid 14 (aluminum for cathode) or a metallic collector grid 13 (copper for anode). The metallic collector grid 13 is similarly coated with two layers of anode plastic 16. The separator 20 is disposed between the facing anode and cathode layers, 15 and 16 respectively, thereby preventing shorting out of the battery. Typically, many layers can be stacked with multiple anode or cathode elements interfacing without interposing a separator. When arranged in substantially aligned registration, the multi-layer simplex or duplex structure can be laminated by conventional lamination means.

The present separator will not fracture under these conditions, and the laminate may be cut with a blade without crushing the edges thereby shorting the battery. Thus, battery components of an infinite variety of shapes can be conveniently obtained. Since the laminate remains highly flexible, the battery components can be embedded after activation with electrolyte in plastic or other material creating a barrier to moisture, and loss of electrolyte. Thus, the source of electrical power for a myriad of articles of manufacture, can be contained within the very structure of the object to be powered. Because of the large number of recharging cycles, the lifetime of the battery can be expected to be as long or longer than that of the powered article itself.

Another advantage to this system, which points to the important utility of a stable laminate not requiring supplemental mechanical constraint, is that traditional battery housings made of metal contribute significantly to the overall weight of the battery. Utilizing the present separator in a stable laminate, thus permits the structure of the article of manufacture itself to provide the battery housing, thereby avoiding a separate weighty component.

In actual construction, short metallic tabs may extend beyond the ends of the laminate to provide connecting points for the circuit linkage. The common electrodes may be interconnected by conventional circuit means. Further advantages of the present invention will be apparent from the Example which follows.

EXAMPLE

A separator according to the method of the invention was made as follows: a base non-woven polyethylene fiber sheet (Web Dynamics, Px0074) was purchased from the vendor. The manufacturer's specifications of the material include a thickness dimension of 2.5 mils and a pore size to not exceed 0.1 mm. The product is manufactured having a rough surface on one side and a smooth surface on the other side. The density of material was empirically determined as 28 g/m². These fiber sheets were manufactured by STET. The sheets were processed by coating intact rolls.

The homopolymer coating step was carried out on approximately 12 foot sections of the rolled fiber sheets, available in 12 inch rolls. A coating mixture was prepared containing 15 g Kynar® 741, brand polyvinylidine difluoride homopolymer, 30 g diethylsuccinate (as a plasticizer), and 150 mls of reagent grade acetone. The mixture was heated in a sealed container to 70° C. to dissolve the ingredients, and cooled to room temperature.

The segment of rolled fiber sheet was placed on a flat glass plate with the smooth side facing the glass. An excess of coating mixture (approximately 75 ml) was poured onto the fiber sheet and distributed smoothly over the surface with a roller. After air drying, the sheet was reversed, and coating solution was applied to the smooth side. Coated weight was 100 g/m$^2$, with a base thickness of 2.5 mil and a coated thickness of about 3.0 mil.

The separator so produced was incorporated into a solid state lithium battery as follows: the cathode comprised 65 percent LiMn$_2$O$_4$ (Chemetal) dispersed in a matrix of substantially similar composition to the homopolymeric coating of the separator. The plastic electrode also contained 5.4 percent Carbon black (Super-P brand) to improve conductivity. The cathode strips were then laminated to both sides of an expanded metal aluminum collector element.

The anode comprised 65 percent graphite (MCMB2528 manufactured by Osaka Gas) in a matrix similar to the cathode. Anode strips were than correspondingly laminated to both sides of an expanded copper current collector elements.

The battery was assembled in duplex mode by arranging in registration in the following precise order: a cathode element, a separator, an anode element, a second separator, and a second cathode element. The elements were fused by lamination at full roller force to achieve a continuous bonded unitary structure. Appropriate foil leads were welded to the structure and subjected to vacuum and heat to remove residual plasticizers.

The bonded battery structure was loaded with electrolytes in a moisture-free environment. The composition of electrolytes was 2 parts ethylene carbonate, 1 part dimethyl carbonate and 1 molar LiPF$_6$. The complete electrolyte solution may be purchased from Mitsubishi. Thereafter, the battery structure was placed in a flexible aluminized plastic housing, to provide an effective solvent/moisture barrier.

The following tests were performed on this battery using an Arbin cycler. The battery was charged in a conditioning cycle at constant 15 milliamp current over a 10 hour period to a voltage endpoint of 4.3 V. The 4.3 V potential was held constant for an additional 2 hours. After a 2 hour rest time, the battery was discharged at 15 milliamps down to 3.0 V.

Figure 2A:
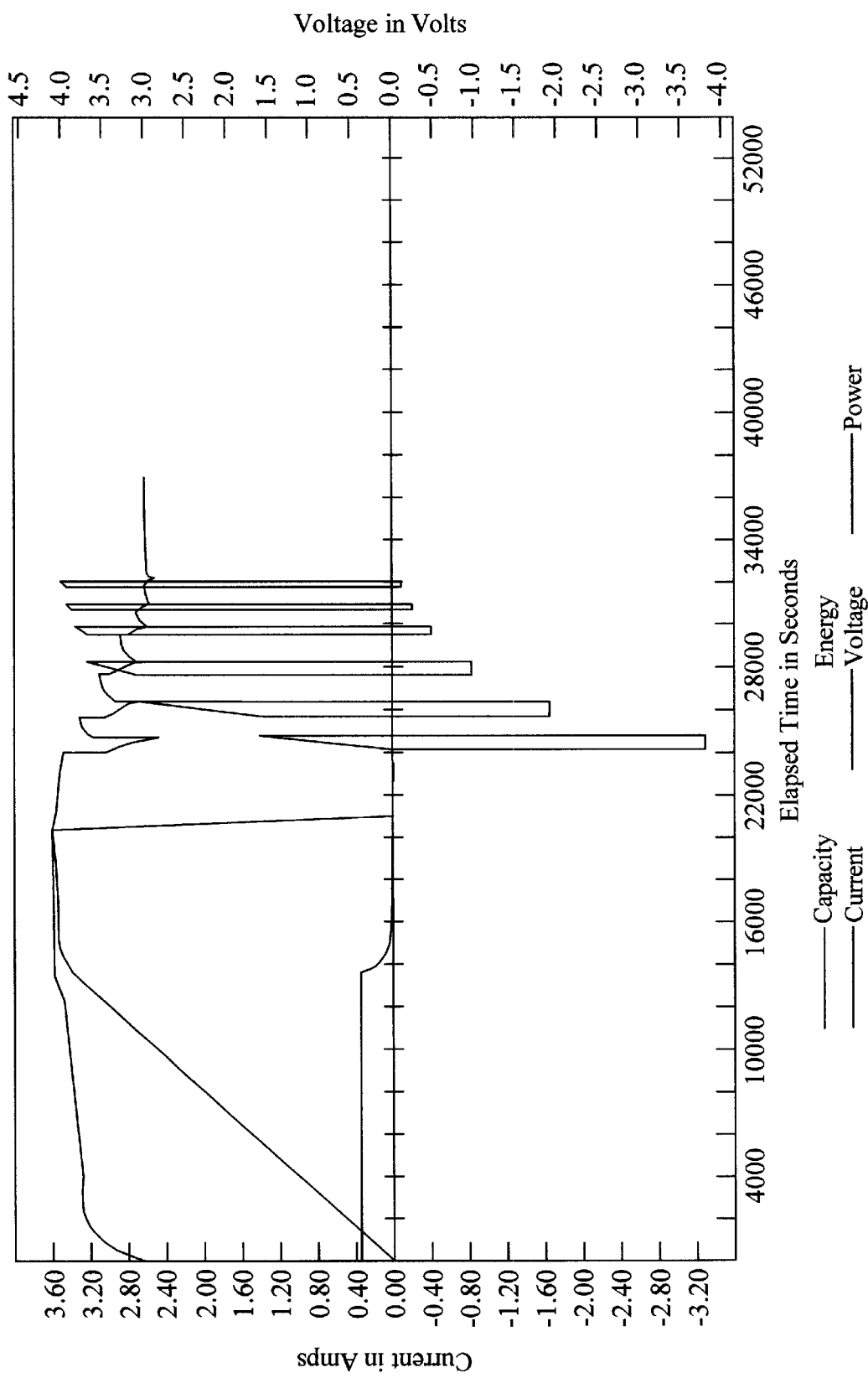
Figure 2B:
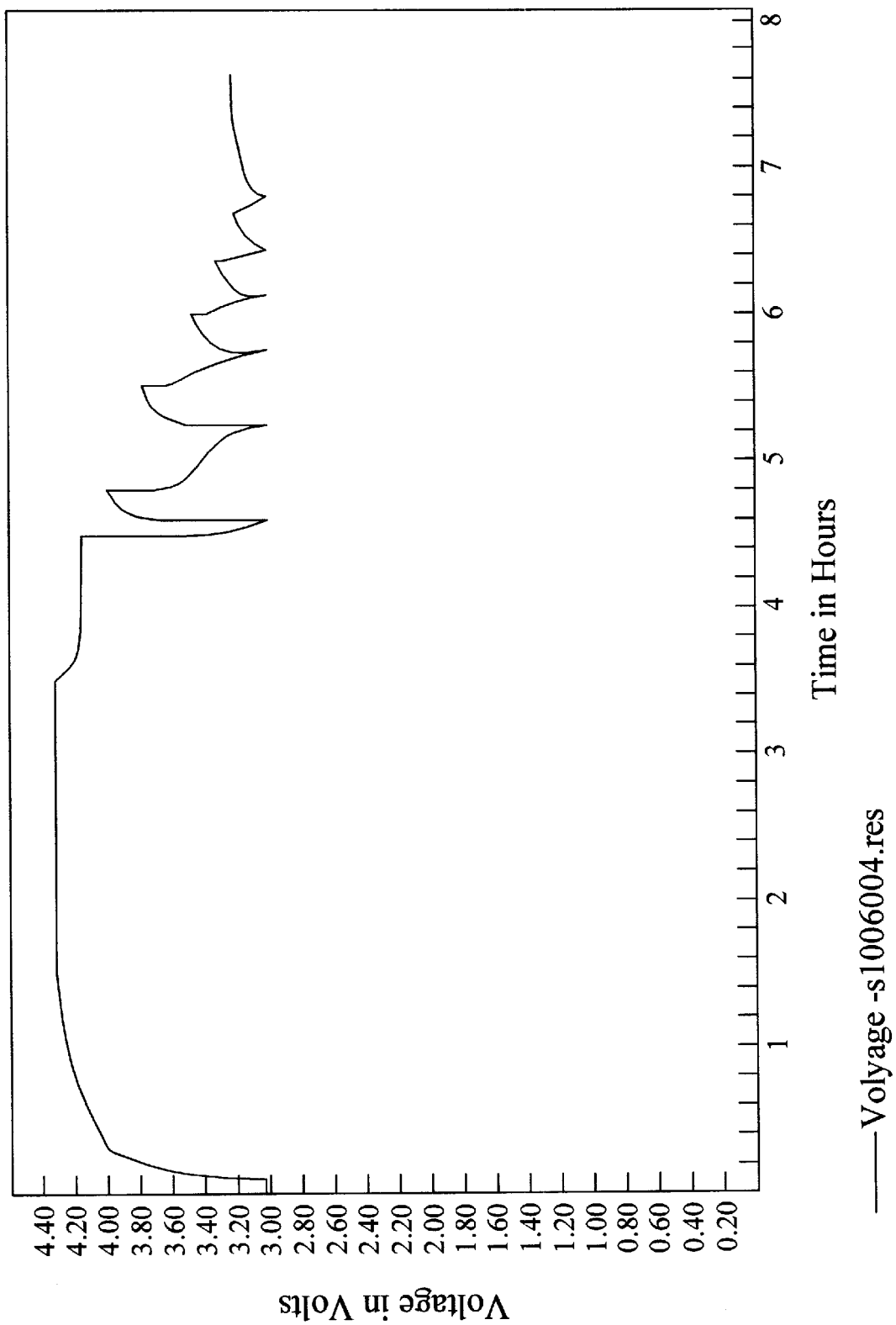
Figure 2C:
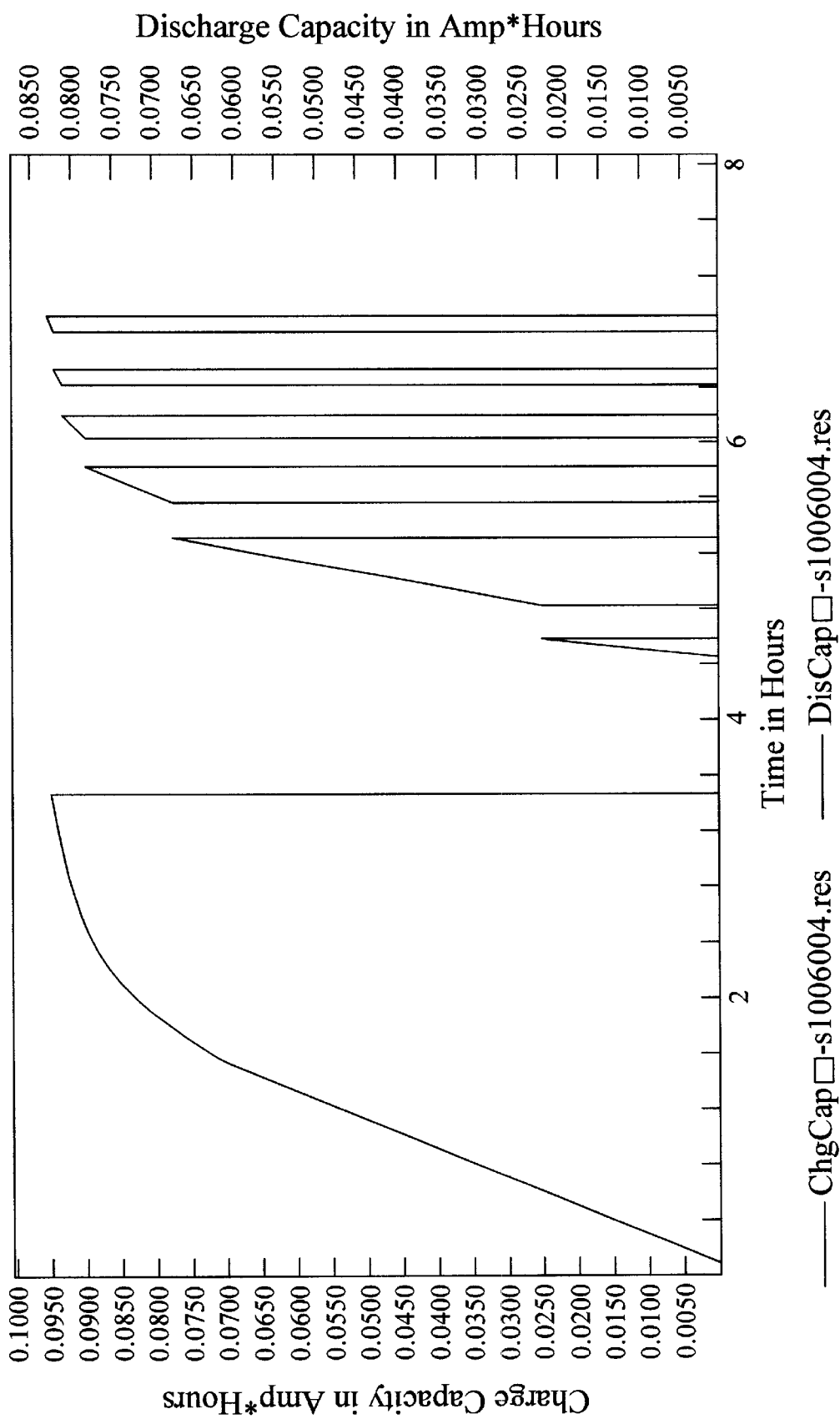

In a second charging cycle, current was applied at 47 milliamps until 4.3 V was reattained for a period of 2 hours. After equilibrium, the cell was discharged at 190 milliamps to 3.0 volts, followed by equilibration, and subsequent sequential discharges at progressively lower amperages. FIG. 2a is a composite of various battery parameters. FIG. 2b shows a plot of the voltage profile as a function of time. FIG. 2c is a plot of the charge and discharge current over time. FIG. 2d is a plot of charge and discharge capacity over the same time interval.

Figure 3:
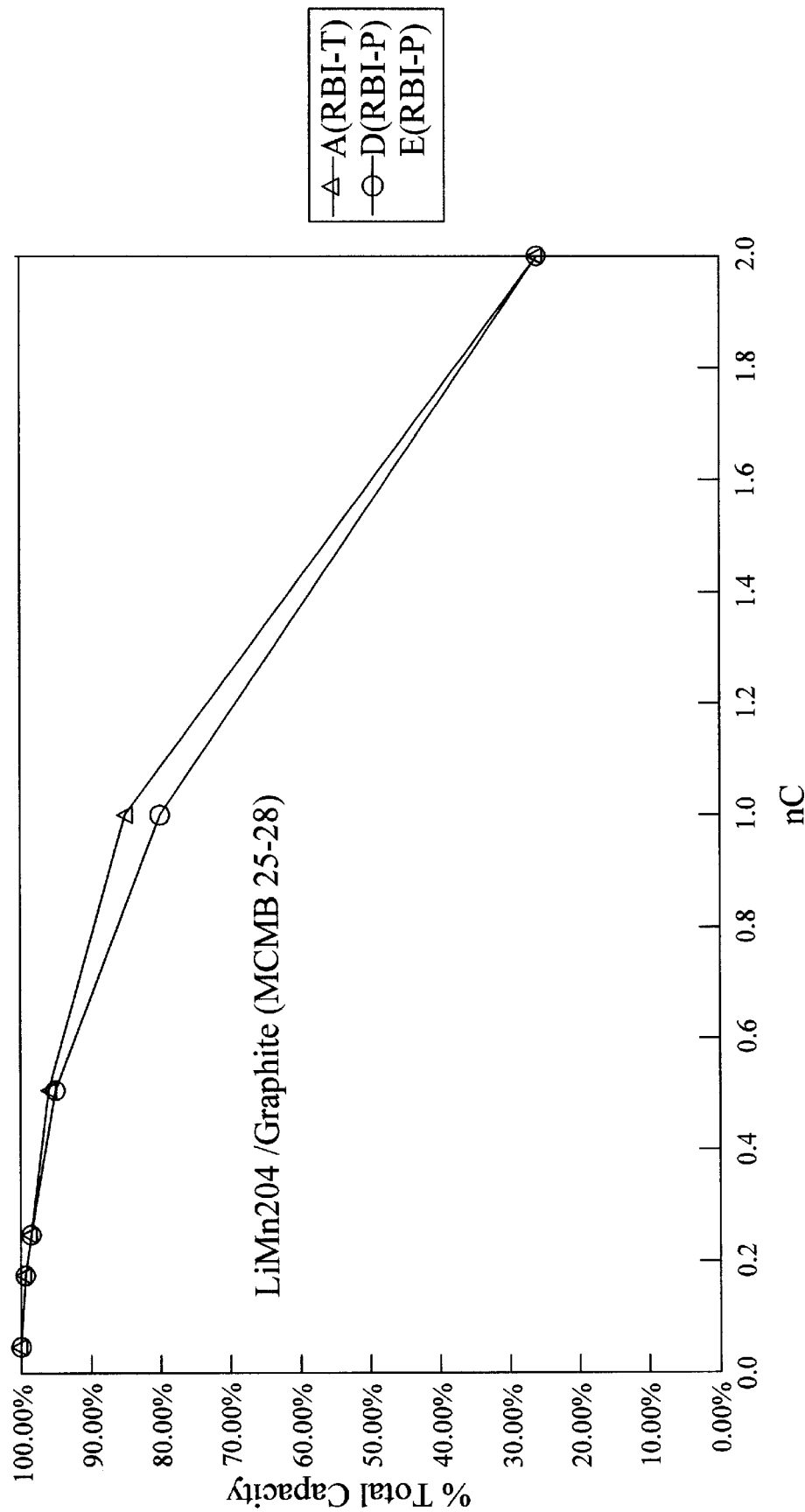
FIG. 3 is a plot of a signature curve whose points are derived from the plots in FIG. 2.

Using this data, a signature curve, shown in FIG. 3, was devised. The results indicate that the 2 C rate delivered 30 percent of the rated capacity of the battery, and the 1 C rate delivered 80 percent of rated capacity. It is concluded that at discharge rates of 1 C or less, there is substantially complete utilization of battery capacity. Cycling was repeated an additional 42 times without product failure resulting from defects in the separator. In repeating the battery construction as defined hereinafter, it was found that intact, functional batteries could be manufactured reproducibly whereas construction utilizing other separators of conventional materials and design were prone to product failure, the lamination process producing cracks and tears in the separator leading to shorting out.

What is claimed is:

1. A polymer lithium or lithium ion battery comprising:

a housing;

electrodes contained in the housing, the electrodes including a carbonaceous or other lithium intercalation anode and a lithium metal oxide cathode;

an electrolyte solution in the housing, the electrolyte solution containing a lithium metal salt capable of ionizing in an organic solvent, said salt being dispersed in said organic solvent;

current collectors electrically connected to the electrodes and disposed in contact with the electrodes; and a separator disposed between the electrodes, the separator including a fibrous matrix core having opposite surfaces and a solvent cast porous polymeric coating layer applied to at least one of said surfaces, wherein the solvent cast porous polymeric coating comprises polyvinylidene difluoride or polytetrafluoroethylene.

* * * * *